US006773146B2

(12) United States Patent
Ishida

(10) Patent No.: US 6,773,146 B2
(45) Date of Patent: Aug. 10, 2004

(54) VEHICULAR HEADLAMP AND DESIGN METHOD THEREFOR

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/273,271

(22) Filed: Oct. 18, 2002

(65) Prior Publication Data

US 2003/0076686 A1 Apr. 24, 2003

(30) Foreign Application Priority Data

Oct. 22, 2001 (JP) .................................... P.2001-323192

(51) Int. Cl.[7] .............................................. G01D 21/02

(52) U.S. Cl. ........................ 362/460; 362/512; 362/539

(58) Field of Search ................................ 362/538, 539, 362/351, 464, 460, 512, 123, 122; 359/642

(56) References Cited

FOREIGN PATENT DOCUMENTS

EP 591566 A1 * 4/1994 ........... F21M/3/16

* cited by examiner

*Primary Examiner*—Alan Cariaso
*Assistant Examiner*—Guiyoung Lee
(74) *Attorney, Agent, or Firm*—Sughrue Mion, PLLC

(57) ABSTRACT

A method for designing a projection-type headlamp, and a projection-type headlamp produced thereby, that allows the position of a shade member and a light source to be set so that the luminous utilization efficiency is optimized for a given allowable height of the headlamp. Design values of the lens diameter and focal distance of the projection lens are set, and characteristics of the luminous utilization efficiency obtained in a case where the first focal point F1 and second focal point F2 of the reflector are changed are determined, and characteristics of the diffusion angle in the vertical light direction obtained in a case where the first focal point F1 and the second focal point F2 are changed are also determined. Then, the luminous utilization efficiency corresponding to the first focal point and the second focal point for a specified value of the diffusion angle are determined, and the first focal point and the second focal point where the luminous utilization efficiency becomes a maximum are determined. The luminous portion of the light source is placed at the thus-determined first focal point F1, and the upper edge portion of a shade member is located near the second focal point F2.

10 Claims, 14 Drawing Sheets

VEHICULAR HEADLAMP AND DESIGN METHOD THEREFOR

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a projection-type headlamp in which the disposition of a shade member and a light source are determined in such a manner that the luminous utilization efficiency of the headlamp is optimized for given values of the diameter and focal distance of a projection lens.

A vehicular headlamp must be designed to illuminate the forward view of the driver so that driving at night can be safely conducted. At the same time, design considerations such as styling, shape, size and the like are also important. For instance, as lamp designs have become more diversified, headlamps have been developed which can have an elongated, rounded or other desired shape. A reduced-height headlamp has been particularly in high demand because it can assist in reducing air resistance of the vehicle by reducing the height of the front end of the vehicle while providing a sporty image to the vehicle design. Also, as shown in FIG. 15, if the height h of the lamp is sufficiently small, it becomes possible to arrange a pair of the lamps above the wheel wells of the vehicle, allowing the vehicle to be designed compactly with a small front overhang (the distance FO from the vehicle front end to the front axle, as indicated in FIG. 15).

In general, as the height of a lamp is reduced, the available luminous flux decreases in proportion to the reduction in height because the available area of the reflector is decreased. Because the vertical portion of a reflector normally contributes to the formation of a diffused light distribution pattern on both sides of the vehicle, if the height of the lamp is reduced, the diffused light is reduced in intensity, reducing the light illuminating the edge of the road or the near range, resulting in a reduction of visibility in the proximity of the vehicle.

A projection-type lamp, which includes an ellipsoidal reflector, a shade and a projection lens, can be employed where the permissible height of the lamp is limited because the allowable area of the reflector is not significantly affected by the reduction in height.

However, if the available height is severely restricted, the diameter of the projection lens (convex lens) of a projection-type lamp must be reduced, and the available light cannot be used efficiently, especially if the focal point of the reflector or other components is not modified.

Generally, it is possible to increase the utilization efficiency by changing the shape and design of the reflector, which though is difficult to achieve on a trial and error basis.

BRIEF SUMMARY OF THE INVENTION

Therefore, it is an object of the present invention to provide a projection-type headlamp in which the position of the shade member or light source is set so that the luminous utilization efficiency of the headlamp is optimized, taking into account any height restrictions imposed on the design of the lamp.

In order to solve the problems mentioned above, the present invention provides a method for optimizing the luminous utilization efficiency of a projection-type headlamp having a given lens diameter and focal distance of the projection lens including the steps of determining the luminous utilization efficiency of the projection-type headlamp with respect to all or a part of the reflecting surface of the reflector of the headlamp as a function of a first focal distance and a second focal distance of the reflector, and also determining characteristics of the diffusion angle in the vertical light direction as functions of the the first focal distance and the second focal distance, thereafter determining the luminous utilization efficiency corresponding to the first focal point and the second focal point for a specified value of the diffusion angle, and determining the first focal distance and the second focal distance where the luminous utilization efficiency is a maximum.

The luminescent portion of the light source is positioned at the first focal point, and a reflector or reflective section where the upper edge portion of the shade member is positioned at or near the second focal point is provided.

The present invention is particularly appropriate for the design of a headlamp of smaller width because the position of the shade member and light source can be set so that the luminous utilization efficiency with respect to the available height is best.

DETAILED DESCRIPTION OF THE INVENTION

The present invention, as it shall now be described with respect to preferred embodiments thereof, relates to a vehicular headlamp provided with a reflector, a light source whose luminescent portion is located at a first focal point of the reflector, a shade member whose upper edge portion is located at or near a second focal point of the reflector, and a projection lens. The invention also relates to method for designing such a headlamp.

The invention can be embodied in the form of a projection-type headlamp, although the invention more generally can be applied to complex-type headlamps or the like including an irradiation section having a similar structure.

First, the principles of the invention shall be described with reference to FIG. 1 to FIG. 5.

Figure 1:
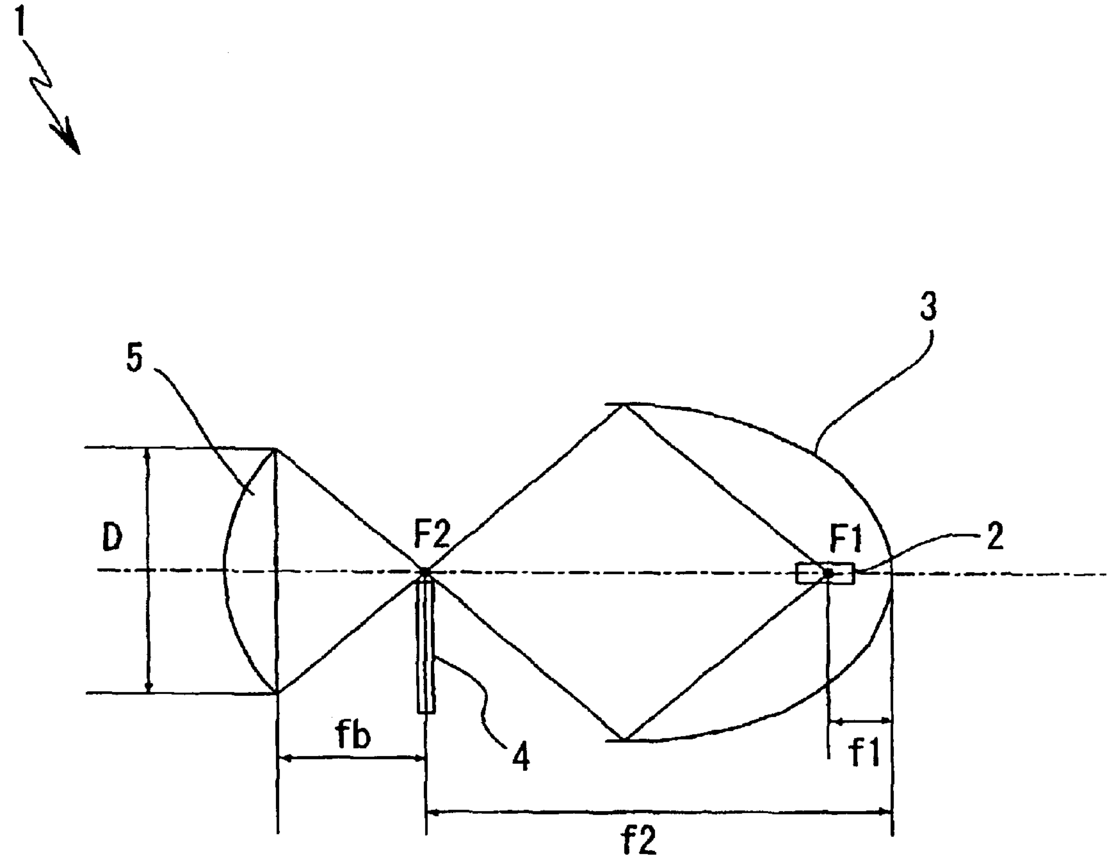
FIG. 1 shows the basic structure of a projection-type lamp in a simplified schematic diagram.

FIG. 1 shows schematically the basic structure of a projection-type headlamp 1, which includes a light source 2, a reflector 3, a shade member (shade) 4, and a projection lens 5.

The light source 2 includes an incandescent bulb, discharge bulb, or other type of bulb having a luminous portion thereof arranged at a first focal point (indicated by F1 in the drawing.) of the reflector 3.

The reflecting surface of the reflector 3 may have, for example and without limitation, a spheroidal portion, or be composed of other known curved surfaces such as a parabolic-ellipsoidal complex surface having a parabolic horizontal section and an ellipsoidal vertical section.

The upper edge portion of the shade 4 is positioned substantially at the second focal point (indicated by F2 in the drawing.) of the reflector 3 and arranged along the incident side focal surface of the projection lens 5.

It should be noted that a first focal distance f1 indicated in the drawing is the distance to the first focal point F1 from the apex of the reflector 3, while a second focal distance f2 is the distance to the second focal point F2 from the apex of the reflector 3. D indicates the diameter of the projection lens 5, while fb is the back focus (backward focal distance) of the projection lens 5.

In designing such a lamp, the height of the lamp is limited by design restrictions imposed on the body of the vehicle. That is, free choice of the height of the lamp is not always assured, and it is often necessary to limit the height of the lamp so as to meet design requirements. Once the height of the lamp has been set, the projection lens 5 can be designed with appropriate values being assigned for the diameter and focal distance of the lens.

It should be noted that, although in the example of FIG. 1 where the reflector has an ellipsoidal shape in a plane cutting the reflecting surface of the reflector along the optical axis of the reflector 3 and the reflector thus has the two well-defined focal points F1 and F2, it is unnecessary for the reflector to have a second focal point, such as in the case where the entire reflecting surface is spheroidal. Also, the reflector may have a second focal point for only a part of the reflecting surface.

Figure 2:
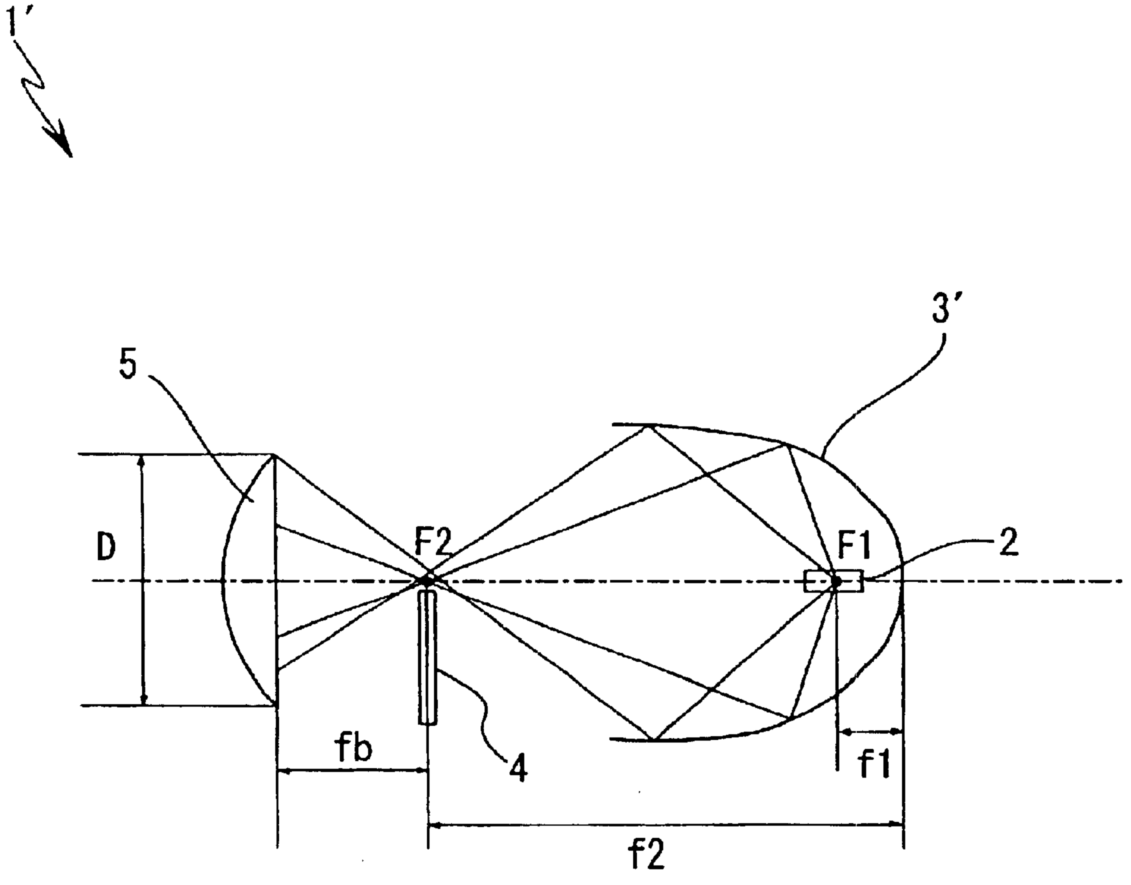
FIG. 2 is a similar view illustrating the structure of a projection-type lamp.

For example, in the embodiment of a projection-type headlamp 1' shown in FIG. 2, the reflector 3' has a spheroidal or nearly spheroidal surface in the area near the optical axis of the reflector 3'. In this case, the surface of the reflector 3' is formed by taking a spheroid as a reference surface and by correcting the reference surface in the peripheral portion of the reflector 3' (for example, a surface represented by an expression adding a higher-order correction term to a quadratic surface expression). In this case, of the light emitted from the vicinity of the focal point F1, light in the paraxial area (the area near the optical path) of the reflecting surface passes through or near the second focal point F2 after reflection, while light reflected by the peripheral portion of the reflecting surface remote from the paraxial area does not always pass through or near F2. It should be noted that, even in a case where there is no second focal point F2 defined for the entire reflecting surface, the position shown by F2 has a role as the reference point (or setting reference point) for designing the sectional shape of the reflecting surface in a plane including the optical axis. Thus, the invention can be applied to reflecting surfaces of various shapes by considering the second focal point F2 as defined in the following description as the reference point.

In the present invention, characteristics of the luminous utilization efficiency (or availability) and characteristics of the diffusion angle in the vertical direction, obtained in a case where the first focal point F1 and second focal point F2 are changed, are employed in order to determine these points. These characteristics can be obtained as the result of simulation in software as described below.

Figure 3:
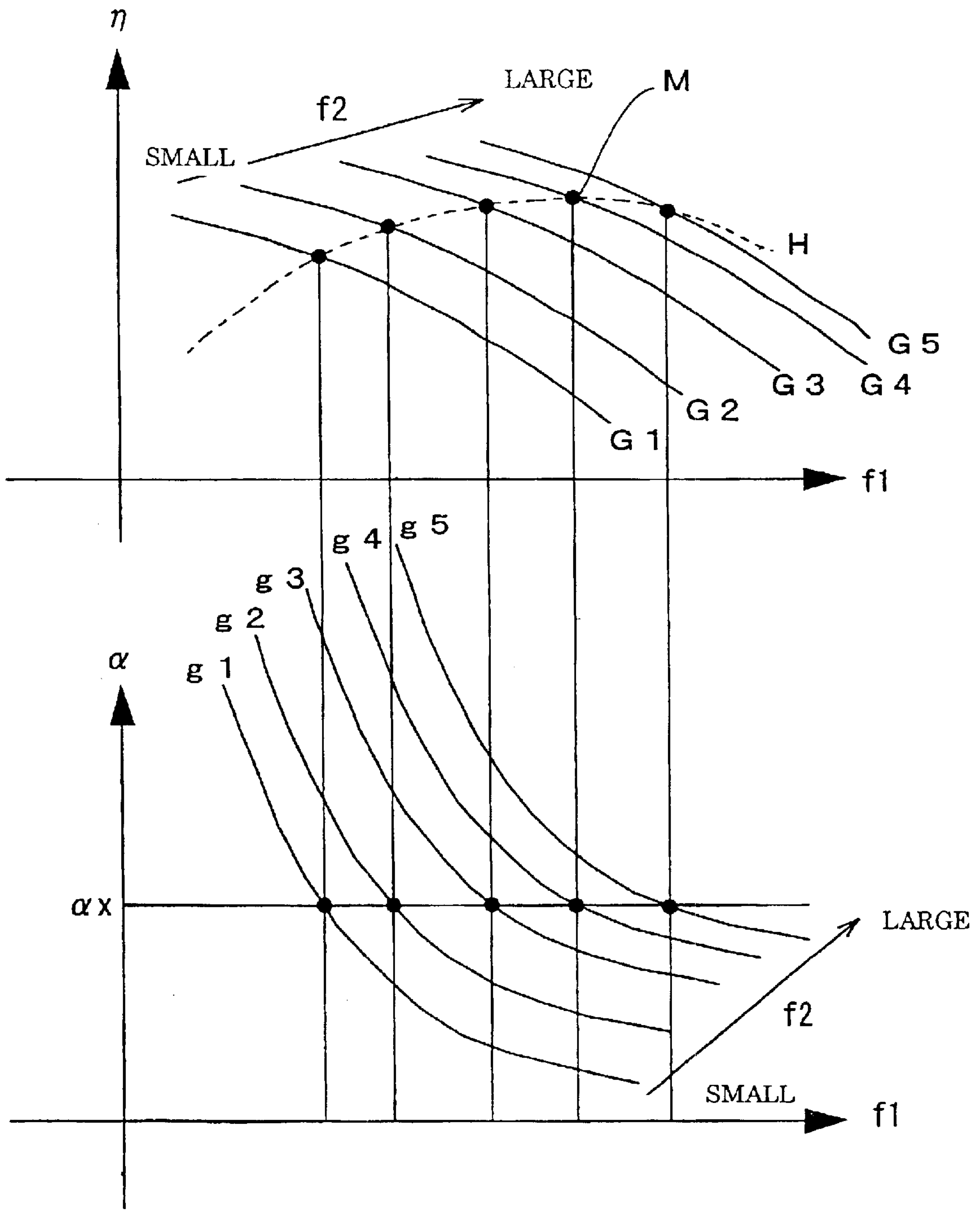
FIG. 3 is a graph showing the luminous utilization efficiency and the vertical diffusion angle as a function of the focal points f1, f2 of a projection-type headlamp.

FIG. 3 is a graph showing changes in the luminous utilization efficiency $\eta$ and the vertical diffusion angle $\alpha$ accordance with the focal distances f1, f2.

The top graph shows a plurality of curves G1, G2, . . . plotting luminous utilization efficiency $\eta$ as a function of f1 for various respective values of f2 as a parameter. It should be noted that the curves are positioned higher as the value of f2 increases, as indicated by an arrow.

The bottom graph shows a plurality of curves g1, g2, . . . plotting the diffusion angle $\alpha$ as a function of f1 for various respective values of f2 as a parameter. It should be noted that the curves are positioned higher as the value of f2 increases, also as indicated by an arrow.

Once the characteristics of the luminous utilization efficiency $\eta$ or the diffusion angle $\alpha$ in the vertical direction as functions of f1 and f2 are established, upon specifying the desired value of the diffusion angle, the values of f1 and f2 yielding the best luminous utilization efficiency can be determined. That is, in a case where the value of the diffusion angle $\alpha$ in FIG. 3 is specified as $\alpha_x$, the corresponding values of f1 are determined as the intersection points of the straight line of $\alpha=\alpha_x$ and each of the curves g1, g2, . . . Therefore, the values of $\eta$ corresponding to these values of f1, namely, the value of $\eta$ at the intersection points of the ordinate axis and the curves G1, G2, . . . , can be determined. The curve H, shown by a broken line in the drawing, connects the intersection points on the curves G1, G2, . . . , and the position indicated by the point M indicates the point of maximum efficiency.

Thus, by specifying the value of the diffusion angle, the luminous utilization efficiency corresponding to the first focal point and the second focal point can be determined, and the first focal point and the second focal point where the luminous utilization efficiency becomes maximal can be determined.

It should be noted that he characteristics of the luminous utilization efficiency and the diffusion angle with respect to f1 and f2 are shown in FIG. 3 in the form of two-dimensional plots to aid in understanding the method of the invention using graphical representations. To carry out the inventive method in a computer program, it is not necessary to actually plot out the sets of curves shown in FIG. 3. Instead, tables of $\alpha$ as a function of f1, f2 and $\eta$ as a function of f1, f2 are compiled, and equivalent operations to those herein described graphically are carried out directly on the compiled data.

Next, restrictive conditions imposed on the aforementioned headlamp, such as lamp depth and available luminous flux, shall be described.

Figure 4:
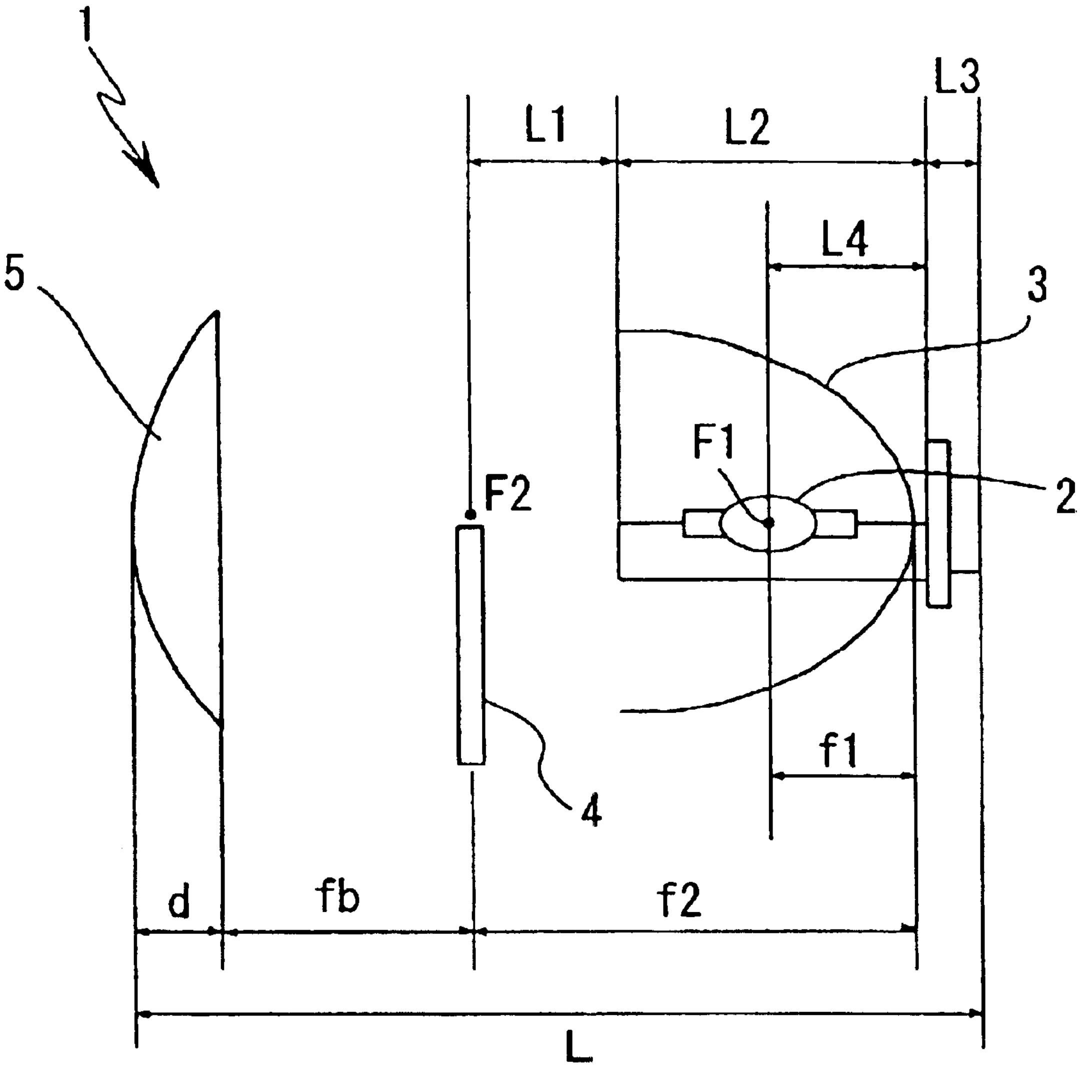
FIG. 4 illustrates, along with FIG. 5, definitions of various parameters in a projection-type headlamp, with FIG. 4 showing various lengths with respect to the optical axis of the headlamp.
Figure 5:
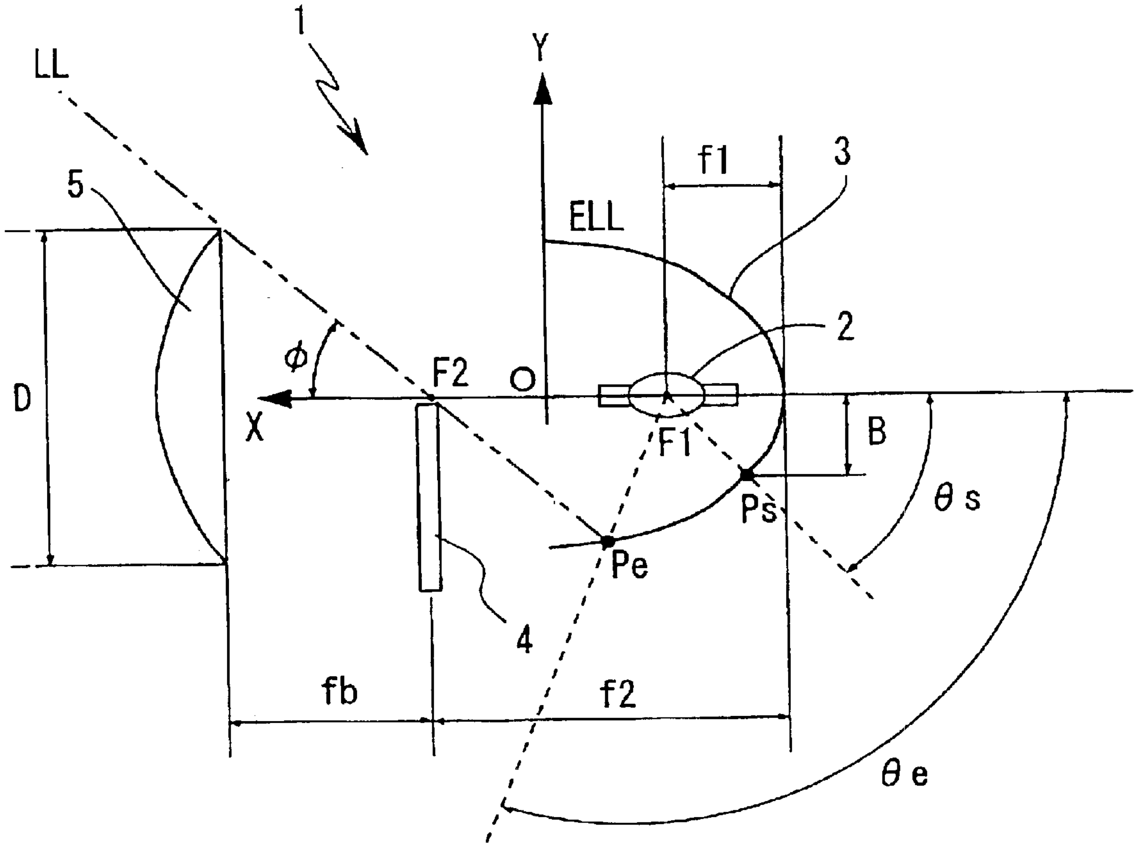
FIG. 5 shows the measurement of various parameters required for the calculation of luminous utilization efficiency.

FIG. 4 and FIG. 5 illustrate the definition of quantities used below, in addition to the aforementioned F1, F2, f1, f2, and fb, and their meanings are as follows:

Quantities indicated in FIG. 4:

L=total length of the lamp (optical system) in the direction of the optical axis L1=distance between the second focal point and the front end of the light source L2=distance from the front end of the bulb socket to the front end of the light source L3=length of the bulb socket L4=distance between the first focal point and the front end of the bulb socket d=maximum thickness of the projection lens 5.

Quantities indicated in FIG. 5 (other than those defined above):

θs=angle of the half line extending from F1 and passing through the point Ps with respect to the optical X axis θe=angle of the half line extending from F1 and passing through the point Pe with respect to the optical X axis Φ=angle of the straight line shown by double-dot line LL passing through F2 and the point Pe with respect to the optical X axis B=external radius of the bulb socket taking the optical X axis as a reference.

It should be noted that, as depicted in these drawings, the light source 2 is a discharge lamp. In addition, as for the two-dimensional Cartesian coordinate system X, Y indicated in FIG. 5, the X axis is aligned with the optical axis, and an axis in a direction orthogonal to the X axis is taken as the Y axis. The intersection point (origin O) of the X and Y axes is set at the center of an ellipse ELL following the sectional shape of the reflector 3. The points Ps, Pe are both positioned on the same half of the ellipse ELL. The distance from the X axis to the point Ps is B, and, the point Pe is located at the intersection of the straight line LL and the ellipse ELL.

First, in the case where a discharge bulb is used, a lower limit, denoted $L1_{min}$, exists for L1 (the distance between the front end of the bulb and the shade member), namely, $L1 \geqq L1_{min}$, as the shade member 4 cannot be any closer than a certain distance to the discharge bulb. The lower limit $L1_{min}$, is determined by the following expression:

$$L1=\{f2+(L4-f1)\}-L2 \geqq L1_{min},$$

and therefore $$f2-f1 \geqq L1_{min}+L2-L4.$$

Thus, a lower limit value exists for f2−f1. It should be noted that standard upper limit values exist for L2 and L3.

The following expression is obtained for the total length L (not including the thickness of the lamp housing), utilizing the distance relation from the projection lens surface to the socket portion rear end:

$$\begin{aligned} L &= d + fb + f2 + (L4 - f1) + L3 \\ &= d + fb + f2 - f1 + L4 + L3 \end{aligned}$$

In this expression, d and fb are determined by the design of the projection lens 5, and f1 and f2 are determined by the design of the reflector 3, as described above. Then, L3+L4 being determined by the specifications of the discharge bulb used as the light source, it can be understood that it is sufficient to reduce the respective values of d, fb and f2−f1 (taking into account the lower limit value mentioned above) in order to shorten L. However, in a case where the reflector shape is taken into account, it should be noticed that the available luminous flux diminishes if f2−f1 is reduced. In short, it is preferred not to reduce the value of f2−f1 unnecessarily because the available luminous flux is affected by the value of f2−f1.

In order to calculate the change of luminous utilization efficiency with respect to the change of f1 and f2, it is sufficient to determine the position of the points Ps and Pe in FIG. 5, calculate the luminous flux to be used in the range of both points, and divide the same by the total luminous flux.

In order to simplify the description, the computation procedures shall be described below assuming a case where the surface shape of the reflector is approximately spheroidal.

Where the reflector is cut by a plane including the X and Y axes, the reflecting surface shape is part of an ellipse (oval arc), and the range from the point Ps to the point Pe positioned thereon is within the reflecting range available for controlled light distribution. However, the distribution of the light emitted from the point F1 cannot be controlled in the same manner as the light reflected from areas near the X axis, as opposed to the point Ps or in a case where the light is reflected from an area more remote from the X axis than the point Pe.

A straight line LL, passing through the intersection point of the outer peripheral edge of the projection lens 5 and X-Y plane, F2 and the point Pe, is represented by the following expression:

$$\text{Straight line } LL: \quad Y = \tan\varphi \times \left(X - \frac{f2 - f1}{2}\right), \qquad \text{[Expression 1]}$$

where $$\varphi = \tan^{-1}\left(\frac{D}{2 \times fb}\right).$$

That is, the slope of the straight line LL is equal to the quotient of the radius of the projection lens 5 divided by fb, while, (f2−f1)/2 corresponds to the distance of the origin O of the X-Y coordinate system from F2.

On the other hand, the expression of the ellipse ELL, as representative of the reflecting surface, is as given by the following expression:

$$\text{Ellipse } ELL: \quad \frac{X^2}{\left(\frac{fl+f2}{2}\right)^2} + \frac{Y^2}{fl \times f2} = 1 \qquad \text{[Expression 2]}$$

The intersection point of the straight line LL and the ellipse ELL is Pe. The X coordinate of Pe is denoted as Pex, and the Y coordinate as Pey. The values of Pex and Pey can be determined by the simultaneously solution of Expressions 1 and 2.

Then, θe is determined by the following expression:

$$\theta e = \tan^{-1}\left(\frac{Pey}{Pex - \frac{f2 - fl}{2}}\right). \qquad \text{[Expression 3]}$$

The point Ps, whose X coordinate is denoted as Psx and the Y coordinate as Psy, is determined easily from the radius B of the bulb socket portion and, consequently, θs can be determined from the following expression:

$$\theta s = \tan^{-1}\left(\frac{Psy}{Psx - \frac{f2 - fl}{2}}\right). \qquad \text{[Expression 4]}$$

Assuming a luminous portion of a plane light source having an even brightness distribution, the luminous intensity distribution is represented by the following expression:

$$I(q) = I_0 \times \sin\theta, \qquad \text{[Expression 5]}$$

where θ indicates an extreme angle measured from the X axis taking the point F1 as a reference, and thus $I(q)=I_0$ when $\theta=\pi/2$.

Therefore, assuming that the available luminous flux from the reflecting surface from θs to θe is FL, the value of FL can be calculated from the following expression:

$$\begin{aligned} FL &= 2\pi \int_{\theta s}^{\theta e} I(\theta) \times \sin(\theta) d q \\ &= 2\pi \times I_0 \times \left[\frac{\theta}{2} - \frac{\sin(2\theta)}{4}\right]_{\theta s}^{\theta e} \end{aligned} \qquad \text{[Expression 6]}$$

With the total luminous flux indicated by FLa, $FLa=\pi^2 I_0$ when the limits θs=0 and θe=π are applied to the above expression.

Therefore, the light utilization efficiency $\eta_R$ on the reflecting surface can be determined as follows:

$$\eta_R = \frac{FL}{FLa} = \frac{FL}{\pi^2 I_0} \qquad \text{[Expression 7]}$$

Figure 6:
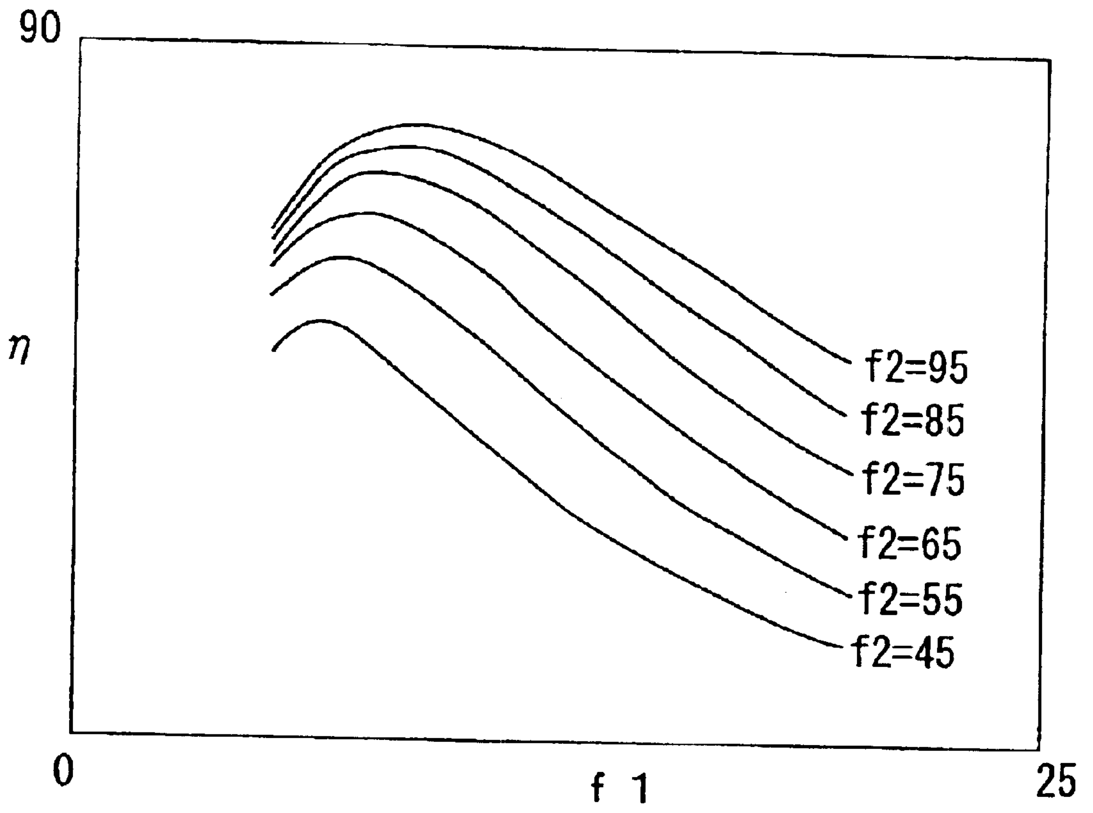
FIG. 6 is a graph showing an example of the relationship between the focal points, f1, f2 and the luminous utilization efficiency of a projection-type headlamp.

FIG. 6 shows an example concerning the relation between the focal distances f1 and f2 (in units of mm) and the luminous utilization efficiency, and shows respective curves in a case where the value of f2 is changed (D, fb, B and other parameters are fixed), where f1 is indicated on the abscissa and the utilization efficiency η (relative value) on the ordinate.

From this graph, the following can be understood:

(1) The efficiency η increases as the f2 value increases.

(2) There is an f1 value where the efficiency η is a maximum with respect to a given value of f2.

Next, the vertical extension of the light distribution shall be described.

Figure 7:
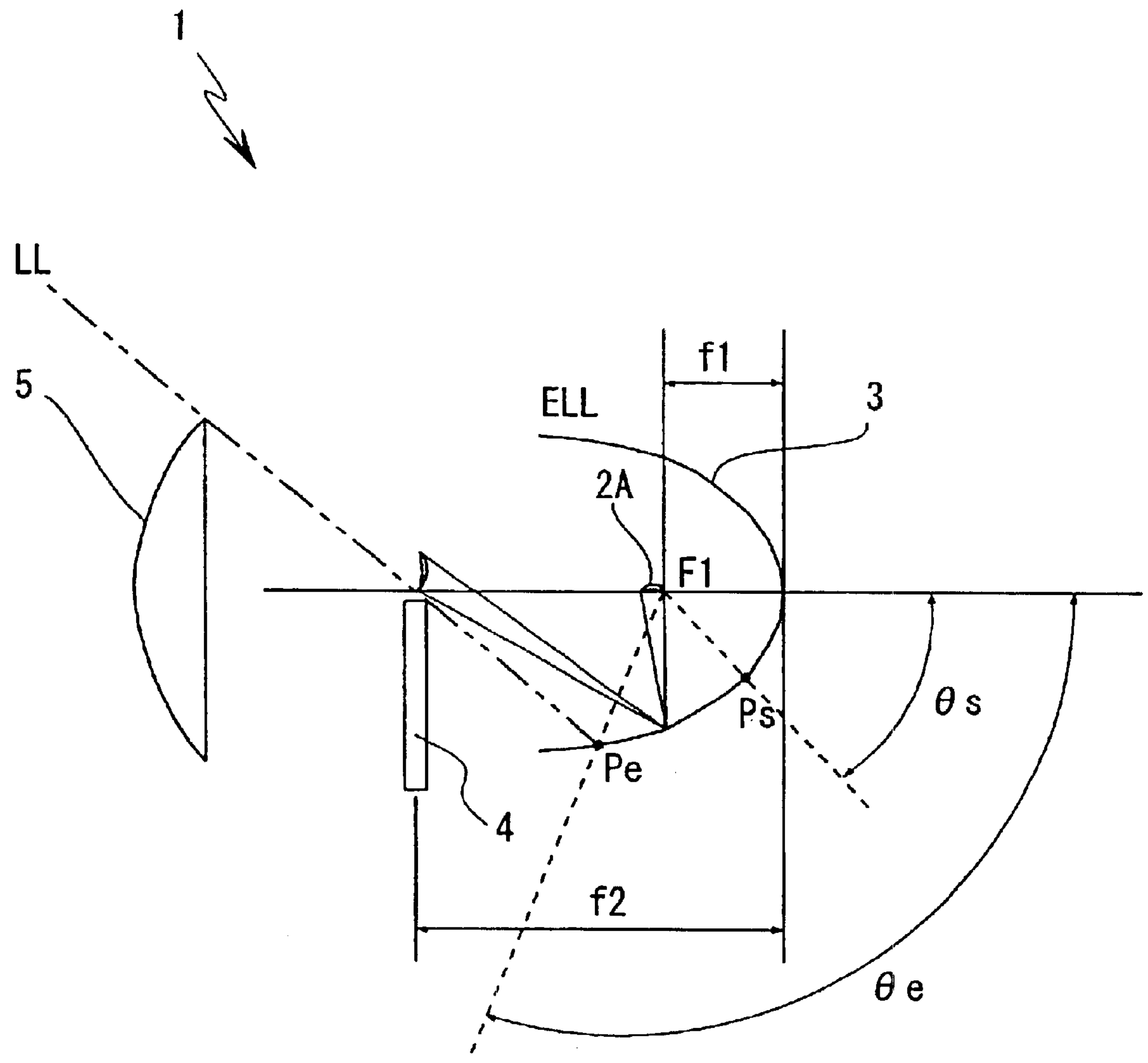
FIG. 7 shows the positional relationship between the light source body and the first focal point in a simplified schematic diagram.

FIG. 7 shows the positional relationship between the light source body and the focal point F1 in a simplified diagram, with the assumption that the light source is a discharge bulb. In this case, the light source body corresponds to an arc 2A (shown as a crescent shape in the drawing). F1, F2, f1, f2, θs, θe indicated in FIG. 7 are defined as described above.

The extension in the lateral direction of the light distribution is determined primarily by the shape of the reflector 3, while the extension in the vertical direction is determined by the focal distance of the projection lens 5 and the positions of F1 and F2. It should be noted that the extension of the latter is normally sufficient if it is around 15 to 20°.

Extension variations in the vertical direction depending on the focal distance of the projection lens 5 and the values of f1 and f2 can be simulated on a computer in software. That is, the projected image of the light source body in a case where light from the light source body is reflected from the surface of the reflector over the angular range from θs to θe on the ellipse ELL shown in FIG. 7 can be calculated. (In a positional relationship where the light is emitted from the light source body and thereafter reflected from any point on the reflecting surface and then passes above the shade member 4, the length of its extension in the vertical direction on a screen disposed sufficiently far in front of the lamp is calculated.)

A detailed explanation of these computations shall be omitted because of their complexity (basically, reflection, refractive index, light beam tracing, or such well-known techniques are employed), and as such is not necessary for practicing the invention. However, the results of such computations are shown graphically in FIG. 8.

Figure 8:
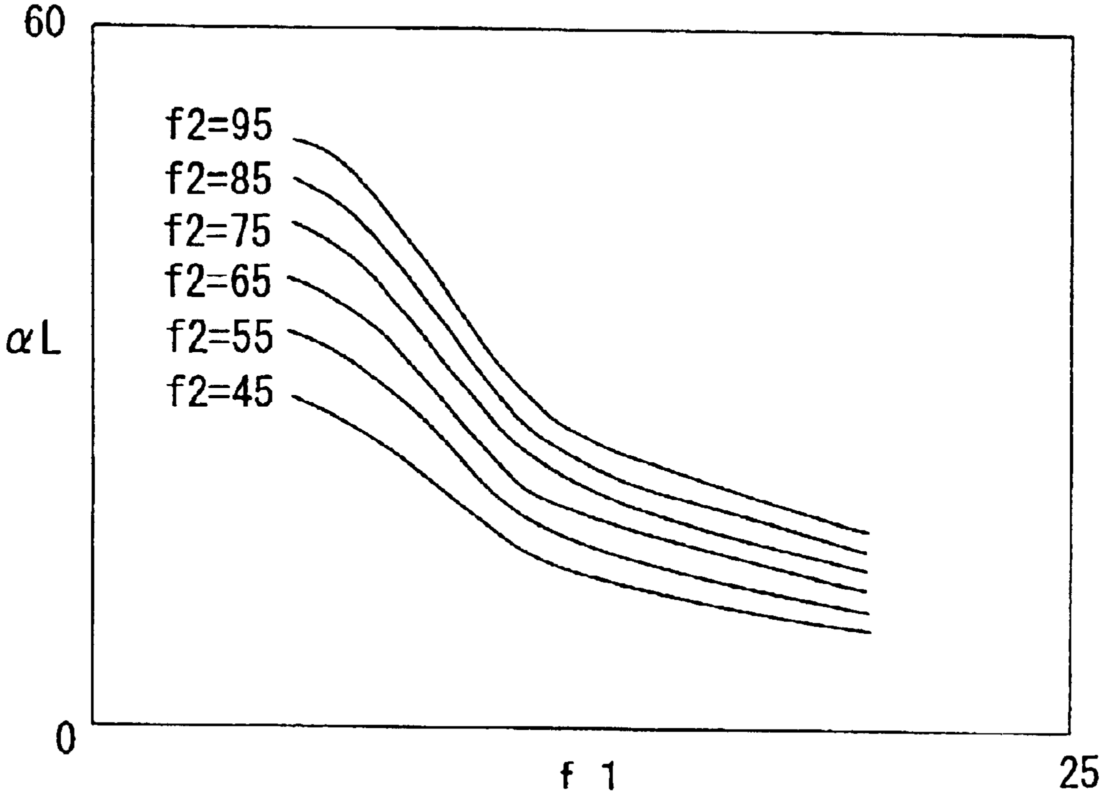
FIG. 8 is a graph showing an example of the relationship between the focal points, f1, f2 and a vertical extension of the light distribution pattern of a projection-type headlamp.

FIG. 8 shows an example of the relationship between the focal distances f1 and f2 (in units of mm) and the vertical extension of the light distribution pattern with f2 as a parameter in the form of plots of the downward diffusion angle αL (in degrees, indicated on the ordinate axis) as a function of f1 (indicated on the abscissa axis), with D, fb, B, etc., fixed.

The findings from these graphs are summarized below:

(1) The downward extension increases as the value of f2 increases.

(2) The diffusion angle varies greatly taking a certain f1 value as boundary (although it should be noted that this also depends on the projection lens design values).

The steps for realizing the design method described above as a software process on a computer are summarized as follows:

(1) Step of designing the projection lens (setting of lens diameter and focal distance).

(2) Step for setting the target value of luminous utilization efficiency.

(3) Step of achieving a value whose luminous utilization efficiency is equal to or greater than the target value in Step (2) above based on the characteristics of luminous utilization efficiency with respect to the position change of F1 and F2 of the reflector, and selecting a combination of focal points making the distance difference of F1 and F2 minimal.

(4) Step of determining the diffusion angle value corresponding to F1 and F2 obtained in Step (3) above based on variations of the diffusion angle in the vertical direction of the light beam with respect to position changes of F1 and F2 of the reflector.

(5) Step of determining F1 and F2 as the final focal points when the diffusion angle value obtained in Step (4)

above is judged to be appropriate for the desired light distribution and excluding the set of F1 and F2 when the diffusion angle value is judged to be inappropriate for the light distribution, and then returning to Step (4) above and repeating the process.

It should be noted that in the judgment in Step (5) as to whether the diffusion angle value is appropriate or not for the desired light distribution, software routines can be used in which an admissible angle range is set in advance and it is determined whether or not the diffusion angle value is within the admissible range, and a routine in which the upper limit value of the diffusion angle value is specified in advance, the value of f1 corresponding to the upper limit is examined for each value of f2 value, and judgment is effected by comparing the value of f1 obtained in Step (3), taking this value of f1 as a reference.

If desired, Steps (1) and (2) may be reversed.

In the headlamp according to the present invention, the luminous portion of the light source is positioned at the focal point F1, which is determined using the above-described design method, and the upper edge portion (or upper end edge) of the shade member is positioned at or near the determined focal point F2.

A complex-type headlamp having one reflecting section at the center and another reflecting section at both sides thereof now shall be explained.

Concerning reducing the height of the lamp, in a conventional optical system having a spheroidal reflector a height of at least about 75 mm is necessary in order to obtain sufficient visibility, making it difficult to reduce the height to around 50 mm, for instance. This is because, as mentioned above, reducing the height reduces the available amount of luminous flux, often making it impossible to obtain sufficient illumination for close-in ranges.

Figure 9:
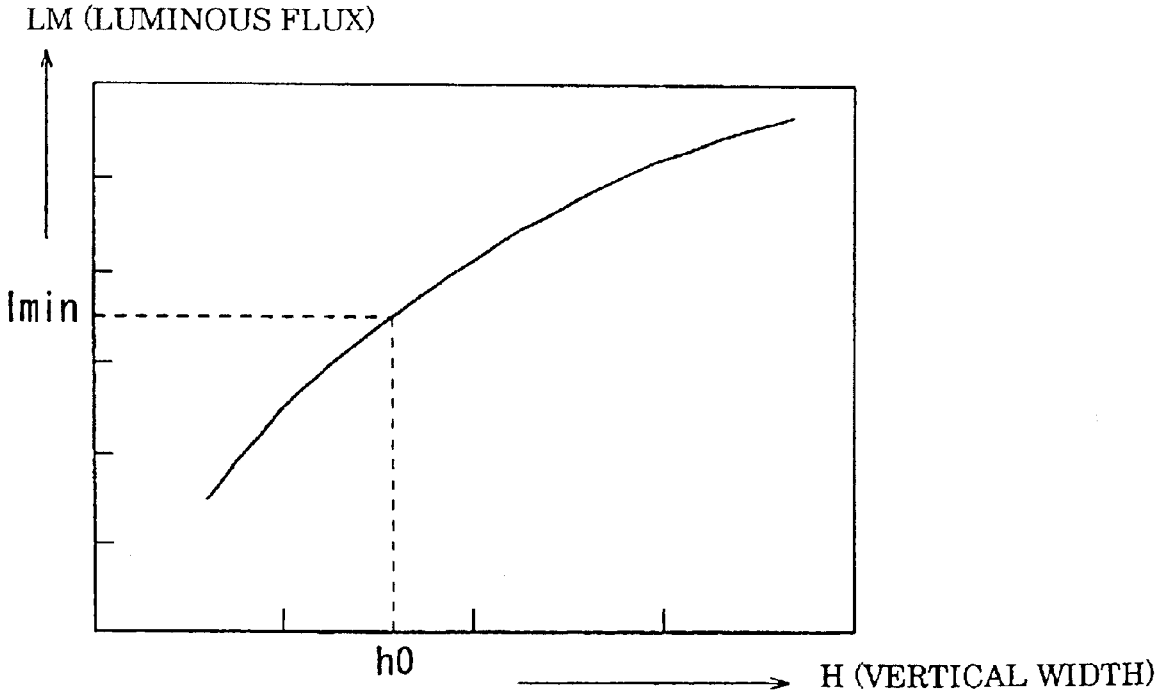
FIG. 9 is a graph illustrating the relationship between the height of the lamp and the available luminous flux.

FIG. 9, which is a graph in which the height h of the lamp is indicated on the abscissa and the luminous flux LM on the ordinate, shows that the minimum required luminous flux (indicated by 1 min in the drawing) cannot be obtained if the height h is equal to or less than a certain critical value h0.

Figure 10:
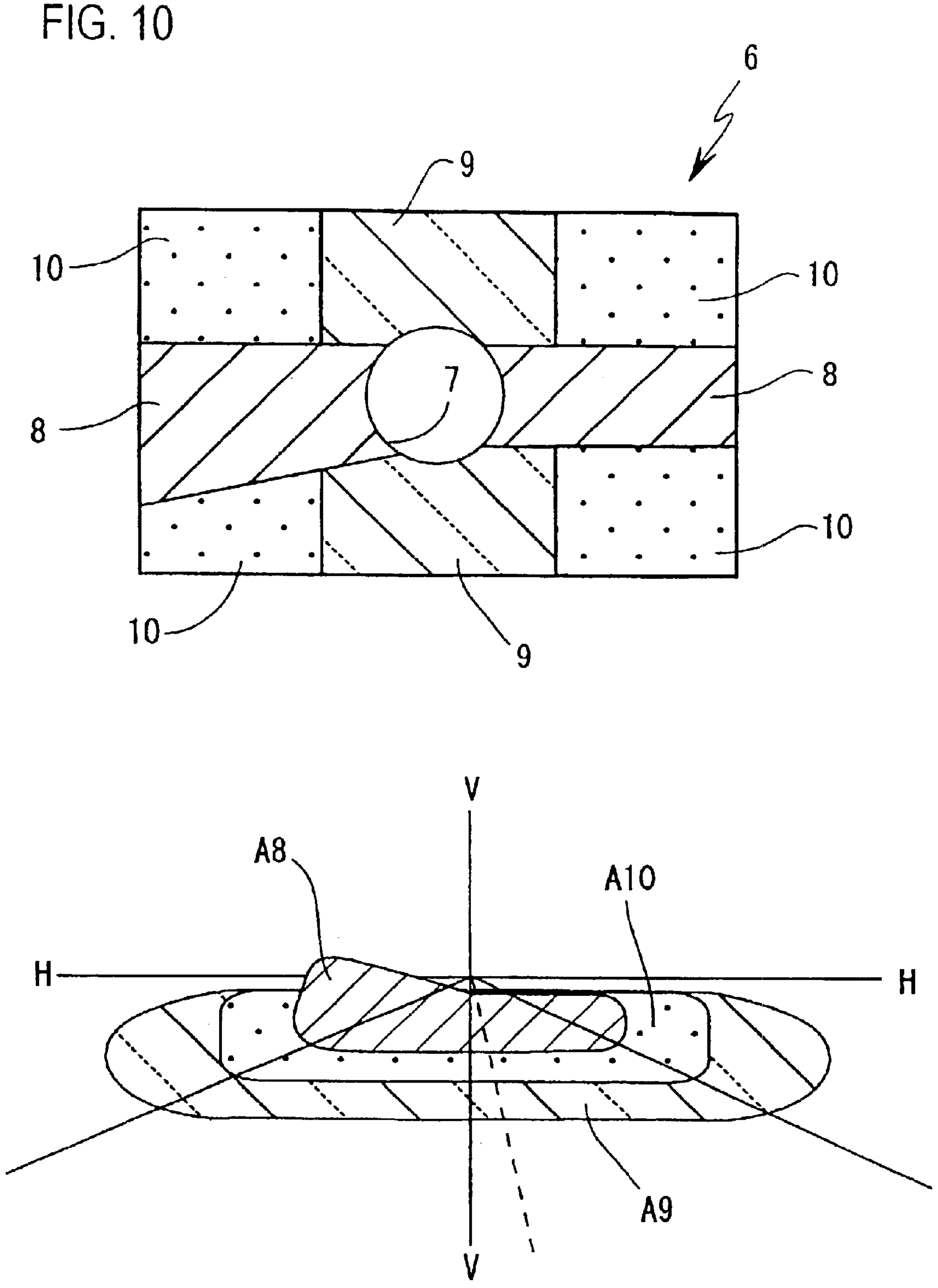
FIG. 10 illustrates an example of area divisions and light distribution patterns on the reflecting surface of a reflector of a projection-type headlamp.

FIG. 10 shows an example of the relation between the area divisions of the reflecting surface and the light distribution patterns of the reflector in which the relationships among the various areas and the light distribution pattern of the reflector are indicated by respective types of hatching. In this drawing, at the bottom the line H—H indicates the horizon and the V—V a vertical line.

A light source insertion hole 7 is formed at the center of a rectangular reflector 6 for inserting and supporting the light source. Light reflected by reflecting portions 8 on the right and left sides of the light source contribute to forming a light beam portion A8 directed substantially to the center of the light distribution pattern as a spot beam. In addition, light reflected by reflecting portions 9 located above and below the light source insertion hole 7 contributes to forming a portion A9 of the light distribution pattern having a large diffusion angle in the lateral direction, and light reflected by reflecting portions 10 located on the right and left sides of the light source contributes to forming a portion A10 of the light distribution pattern having a medium diffusion angle in the lateral direction.

If the height of the lamp is reduced, the areas of the reflecting portions contributing to the formation of the portions A9 and A10 of the light distribution pattern unavoidably must be reduced, and consequently the intensity of the diffused light in the horizontal direction is reduced, causing it to eventually separate from the spot beam.

Figure 11:
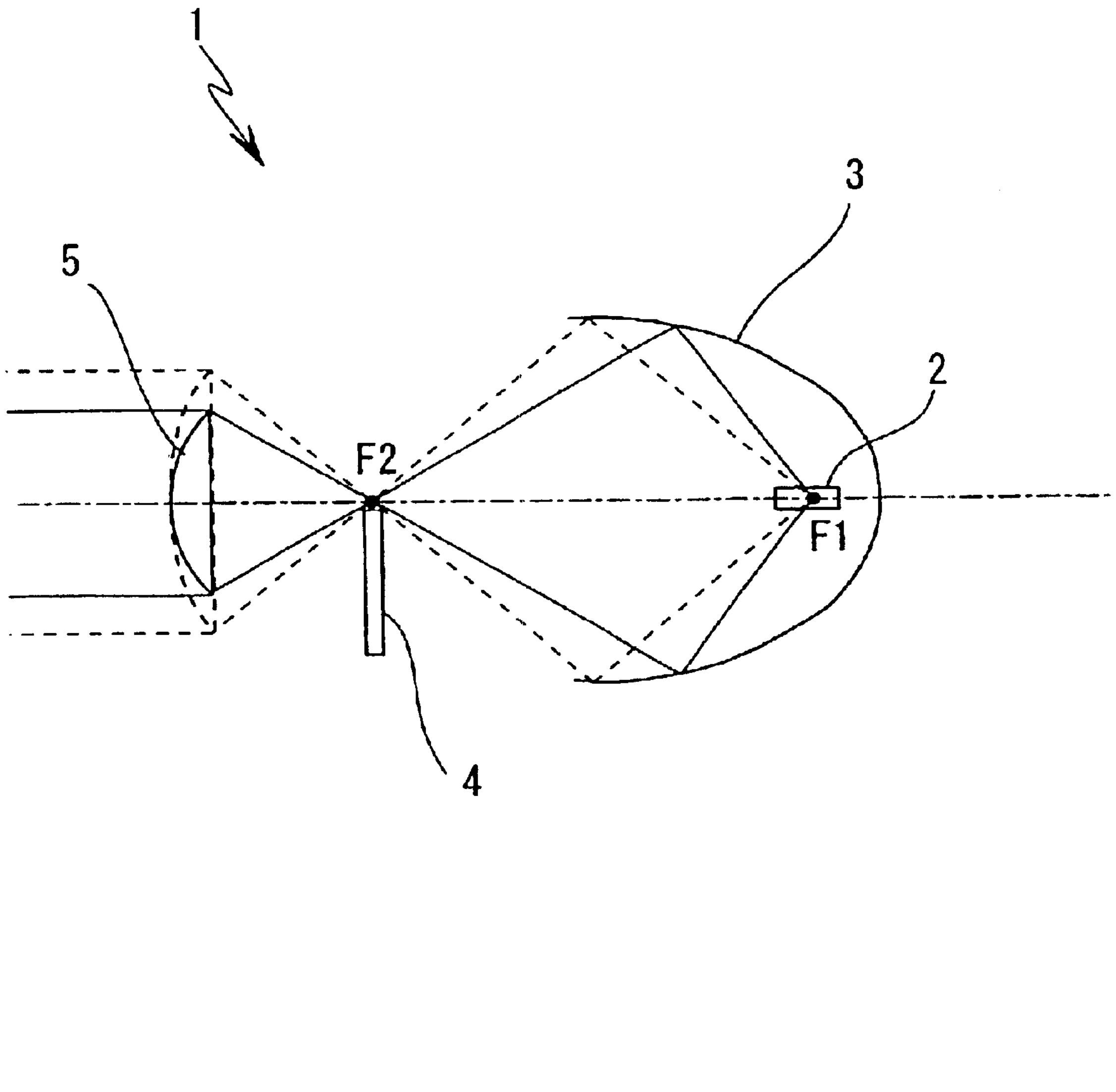
FIG. 11 is a simplified schematic diagram of a projection-type headlamp, illustrating effects caused by reducing the height of the lamp.

Therefore, in accordance with the invention, the decrease of diffused light resulting from the reduced height of the lamp is compensated with an appropriately designed projection-type lamp structure. That is, in the inventive projection-type lamp structure, the total available light output from the various reflecting portions is not strongly affected even if the height is reduced, allowing the lamp to provide a relatively high total luminous flux. However, it is rather difficult to form a spot beam. That is, if the height of the lamp is reduced, as the diameter of the projection lens 5 becomes smaller, as shown in FIG. 11 it becomes more difficult to obtain sufficient input light to the lens, which passes near the focal point of the projection lens 5, to provide a sufficiently intense spot beam (refer to the beam line indicated by a broken line in the same drawing).

Accordingly, further in accordance with the invention, a projection-type headlamp structure which provides a good diffused light pattern and a reflector (for example, a reflector having a nonspheroidal surface) which provides a good spot beam can be used in combination to allow the headlamp to take advantages of both effects.

Figure 12:
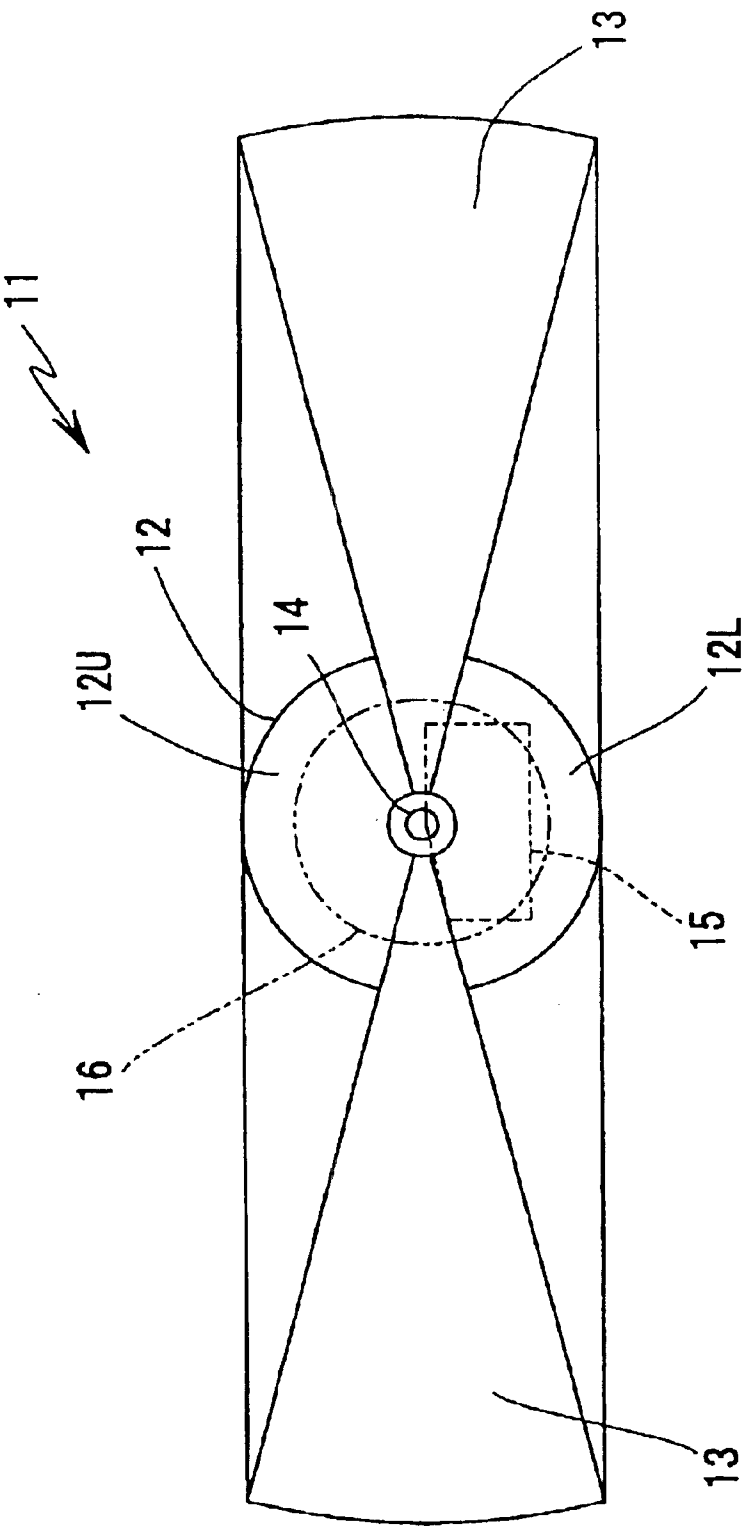
FIG. 12 is a front view showing the structure of a projection-type headlamp.

FIG. 12 is a front view showing a structural example 11 of a headlamp of the invention, which is provided with two reflecting portions 13 provided on the right and left sides of a projector portion 12 at the center of the lamp.

Concerning the projector portion 12, two reflecting portions 12U and 12L constituting an ellipsoidal reflector are located respectively above and below a light source 14 and a shade member 15, indicated by single-dot line, and a projection lens 16, indicated by a two-dot line, are mounted in front of the shade member 15.

The reflecting portions 13 have a fan shape, extending in the lateral direction when viewed from the front of the lamp. Light emitted from the light source 14 and passing between the reflecting portions 12U and 12L is reflected forwardly by the reflecting portions 13. The shape of the reflecting surface of the reflecting portions 13 may be defined by a freely curved surface (which cannot be represented by a simple analytic expression), it may be designed as an assembly of a number of reflective elements (reflective steps), or it may be constituted by a combination of the two or another known surface shape.

As a specific example of a structure of the invention, a headlamp intended for low-beam irradiation having a height of 50 mm and a width of 200 mm was produced as a test. The main specifications of the headlamp were as follows:

n (refractive index of the projection lens)=1.5

D=36.6 mm fb=40 mm f1=15 mm f2=75 mm

Figure 13:
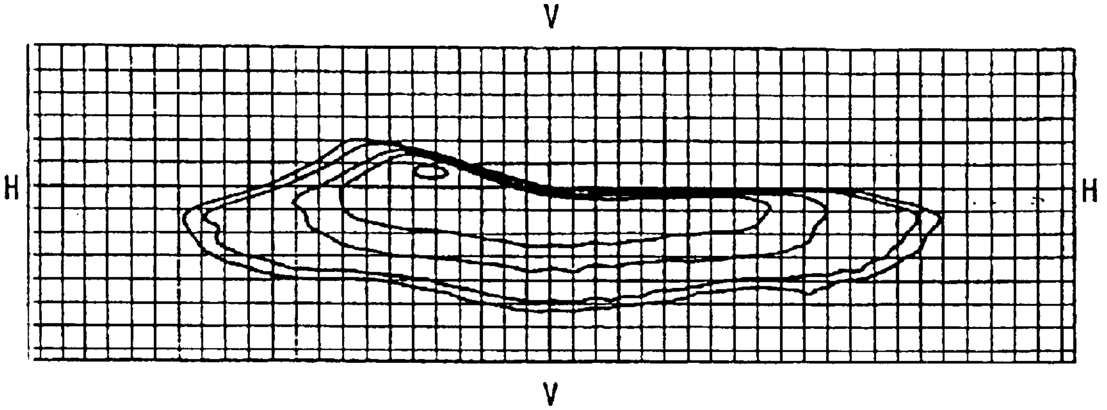
FIG. 13 shows an example of light distribution pattern produced by a projector portion shown in FIG. 12.
Figure 14:
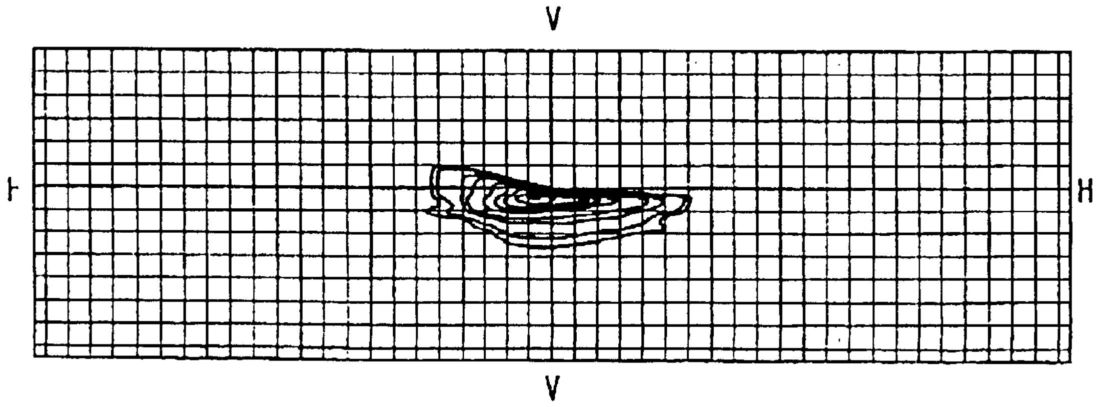
FIG. 14 shows the light distribution pattern produced by reflecting portions shown in FIG. 12.
Figure 15:
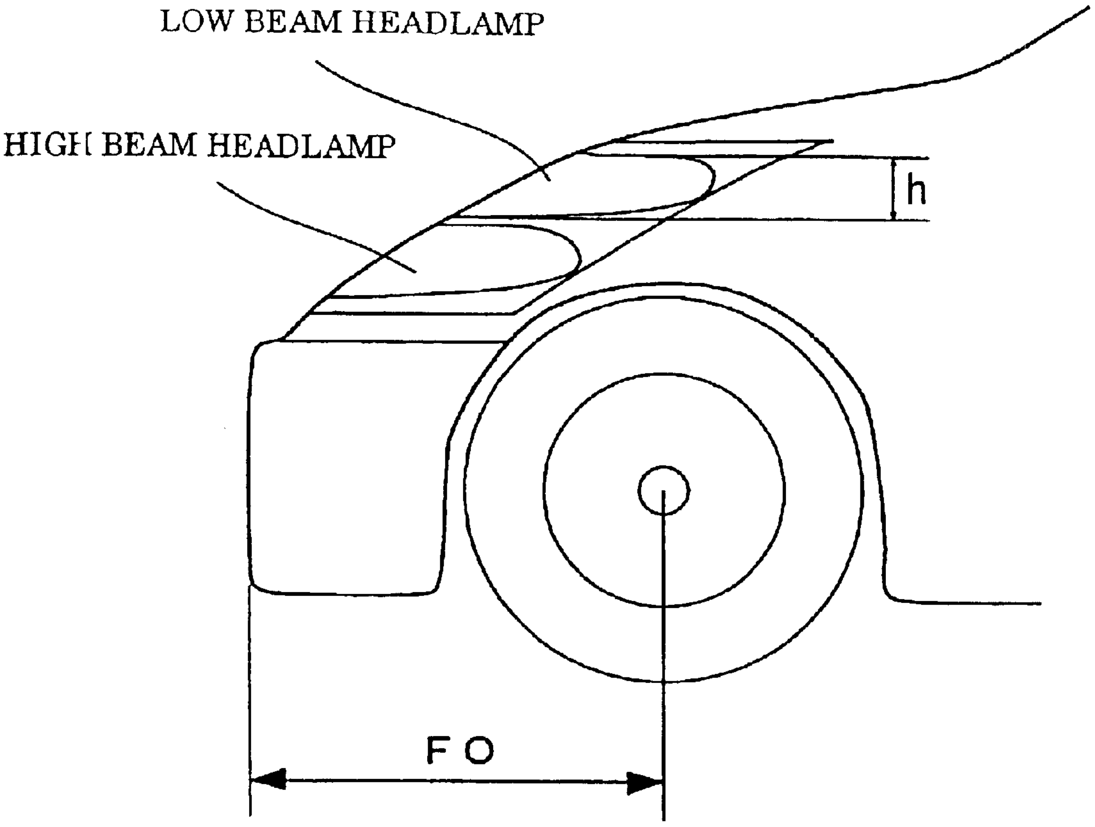
FIG. 15 schematically shows the side of a front portion of an automotive vehicle.

Measurement results concerning the light distribution pattern produced by this headlamp are shown in FIG. 13 and FIG. 14. FIG. 13 shows the light distribution on a screen produced by the projector portion 12, while FIG. 14 shows the light distribution on the screen produced by the reflecting portions 13. It has been confirmed that the extension in the horizontal direction by light from the projector portion 12 is sufficient, and generally a light distribution pattern providing excellent visibility on road shoulders, curved roads, and the like was obtained.

Thus, the present invention makes it possible to design an extremely compact headlamp for automotive vehicles while simultaneously satisfying vehicle design demands such as a short overhang or low nose. In addition, the present invention also makes it possible to overcome adverse effects otherwise caused when the height of a lamp is reduced. According to the design method of the present invention, because it is possible to set F1 and F2 so that the luminous utilization efficiency is maximized for a given diffusion angle in the vertical direction, it can be applied to a headlamp of any height, and it can be applied to rectangular, round, elongated, or other various other types of lamp shape.

Moreover, because the shade member and the light source are positioned so that the luminous utilization efficiency is optimal for a given height of the lamp, it becomes possible to design a lamp having even a quite narrow width. Additionally, because the design guidelines for the headlamp have been made systematic and clarified, the design effort is reduced. Still further, with the invention it is possible to respond flexibly to design requirements for the headlamp without producing a headlamp with lowered luminous utilization efficiency.

Yet further, by suitably positioning the luminous portion of the light source and the upper edge portion of the shade member with respect to the first focal point and the second focal point, the luminous utilization efficiency is made optimal.

It should further be apparent to those skilled in the art that various changes in form and detail of the invention as shown and described above may be made. It is intended that such changes be included within the spirit and scope of the claims appended hereto.

What is claimed is:

1. A method for designing a vehicular headlamp having a reflector, a projection lens disposed forward of said reflector, a light source having a luminescent portion located at a first focal point of said reflector located a first focal distance from an apex of said reflector, and a shade member having an upper edge portion located at or near a second focal point of said reflector located a second focal distance from said apex, comprising:

(a) setting design values of a diameter and focal distance of said projection lens;

(b) determining luminous utilization efficiency characteristics for said headlamp as a function of first and second focal distances of said reflector for said design values of said diameter and focal distance of said projection lens;

(c) determining diffusion angle characteristics of said headlamp in a vertical light direction as a function of said first and second focal distances for said design values of said diameter and focal distance of said projection lens;

(d) specifying a value of said diffusion angle;

(e) determining values of said first and second focal distances where said luminous utilization efficiency is a maximum from said luminous utilization characteristics and said diffusion angle characteristics for the specified value of said diffusion angle.

2. The method for designing a vehicular headlamp according to claim 1, wherein said step (e) of determining values of said first and second focal distances where said luminous utilization efficiency is a maximum comprises:

(e1) determining values of said first and second focal distances from said diffusion angle characteristics corresponding to said specified value of said diffusion angle;

(e2) determining values of said luminous utilization efficiency from said luminous utilization efficiency characteristics corresponding to the values of said first and second focal distances determined in step (e1); and (e3) determining a maximum value of said luminous utilization efficiency from among the values of said luminous utilization efficiency determined in step (e2).

3. A method for designing a vehicular headlamp comprising a reflector and a light source of which a luminescent portion is placed at a first focal point thereof located a first focal distance from an apex of said reflector, a shade member of which an upper edge portion is placed at or near a second focal point of a reflecting surface of the reflector located a second focal distance from said apex, and a projection lens, comprising the steps of:

(a) setting a diameter and a focal distance of said projection lens and a target value of luminous utilization efficiency of said headlamp;

(b) selecting a set of first focal distances and second focal distances of said reflector where said luminous utilization efficiency is equal to or greater than said target value based on characteristics of said luminous utilization efficiency as a function of said first and second focal distances for said diameter and focal distance of said projection lens;

(c) selecting values of said first and second focal distances for which a distance difference between said first focal point and said second focal point is a minimum;

(d) determining a diffusion angle value corresponding to the first and second focal points obtained in step (c) based on characteristics of said diffusion angle in the light vertical direction of said reflector as a function of said first and second focal distances;

(e) determining if the diffusion angle value determined in step (d) is adequate to obtain a predetermined light distribution;

(f) if in step (e) the diffusion angle value is determined to be acceptable, determining the corresponding first and second focal distances as final focal distances for said reflector;

(g) if in step (e) the diffusion angle values is not determined to be acceptable, repeating steps (d) through (f) until an acceptable diffusion able value is determined.

4. A vehicle headlight comprising a reflector, a projection lens disposed forward of said reflector, a light source having a luminescent portion located at a first focal point of said reflector located a first focal distance from an apex of said reflector, and a shade member having an upper edge portion located at or near a second focal point of said reflector located a second focal distance from said apex, said first and second focal distances having values in accordance with values of said first and second focal distances determined by the method comprising the steps of:

(a) setting design values of a diameter and focal distance of said projection lens;

(b) determining luminous utilization efficiency characteristics for said headlamp as a function of first and second focal distances of said reflector for said design values of said diameter and focal distance of said projection lens;

(c) determining diffusion angle characteristics of said headlamp in a vertical light direction as a function of said first and second focal distances for said design values of said diameter and focal distance of said projection lens;

(d) specifying a value of said diffusion angle;

(e) determining values of said first and second focal distances where said luminous utilization efficiency is a maximum from said luminous utilization characteristics and said diffusion angle characteristics for the specified value of said diffusion angle.

5. The vehicular headlamp according to claim 4, wherein said step (e) of determining values of said first and second focal distances where said luminous utilization efficiency is a maximum comprises:

(e1) determining values of said first and second focal distances from said diffusion angle characteristics corresponding to said specified value of said diffusion angle;

(e2) determining values of said luminous utilization efficiency from said luminous utilization efficiency characteristics corresponding to the values of said first and second focal distances determined in step (e1); and (e3) determining a maximum value of said luminous utilization efficiency from among the values of said luminous utilization efficiency determined in step (e2).

6. The vehicular headlamp according to claim 4, wherein said reflector has an ellipsoidal shape.

7. The vehicular headlamp according to claim 4, wherein said reflector has a complex shape.

8. A vehicle headlight comprising a reflector, a projection lens disposed forward of said reflector, a light source having a luminescent portion located at a first focal point of said reflector located a first focal distance from an apex of said reflector, and a shade member having an upper edge portion located at or near a second focal point of said reflector located a second focal distance from said apex, said first and second focal distances having values in accordance with values of said first and second focal distances determined by the method comprising the steps of:

(a) setting a diameter and a focal distance of said projection lens and a target value of luminous utilization efficiency of said headlamp;

(b) selecting a set of first focal distances and second focal distances of said reflector where said luminous utilization efficiency is equal to or greater than said target value based on characteristics of said luminous utilization efficiency as a function of said first and second focal distances for said diameter and focal distance of said projection lens;

(c) selecting values of said first and second focal distances for which a distance difference between said first focal point and said second focal point is a minimum;

(d) determining a diffusion angle value corresponding to the first and second focal points obtained in step (c) based on characteristics of said diffusion angle in the light vertical direction of said reflector as a function of said first and second focal distances;

(e) determining if the diffusion angle value determined in step (d) is adequate to obtain a predetermined light distribution;

(f) if in step (e) the diffusion angle value is determined to be acceptable, determining the corresponding first and second focal distances as final focal distances for said reflector;

(g) if in step (e) the diffusion angle values is not determined to be acceptable, repeating steps (d) through (f) until an acceptable diffusion able value is determined.

9. The vehicular headlamp according to claim 8, wherein said reflector has an ellipsoidal shape.

10. The vehicular headlamp according to claim 8, wherein said reflector has a complex shape.

* * * * *